United States Patent
Halkema

[15] 3,642,199
[45] Feb. 15, 1972

[54] THERMOSTATIC MIXER FOR HOT AND COLD LIQUIDS

[72] Inventor: Maarten Halkema, 10, rue des Boudines, Meyrin, Switzerland

[22] Filed: Feb. 18, 1970

[21] Appl. No.: 12,306

[30] Foreign Application Priority Data

Mar. 4, 1969  Switzerland ............................ 3249/69

[52] U.S. Cl. ................................ 236/12 A, 236/87, 251/35
[51] Int. Cl. ..................................................... G05d 11/16
[58] Field of Search .................. 236/12 R, 12 A; 137/607, 90; 251/35

[56] References Cited

UNITED STATES PATENTS

| | | | |
|---|---|---|---|
| 3,489,347 | 1970 | Egli | 236/12 |
| 2,542,273 | 1951 | Brown | 236/12 A |

*Primary Examiner*—William E. Wayner
*Attorney*—Ernest G. Montague

[57] ABSTRACT

A thermostatic mixer for hot and cold liquids includes a casing to which the liquids are delivered for mixing through first and second inlets controlled by respective diaphragm-type distribution valves. A back-pressure chamber is associated with each of the distribution valves and is closed by the diaphragm of the respective valve. Liquid is supplied to each chamber from the upstream side of the respective valve and passes out of the chamber through a delivery jet. Distributing means responsive to movement of a bimetallic strip controls the delivery of liquid through the delivery jets thereby controlling the pressures in the back-pressure chambers. The intake of each chamber includes a movable intake nozzle borne by the diaphragm of the respective valve and presenting an intake orifice through which extends a needle of varying cross section for varying the effective cross section of the intake orifice in dependence on the position of the intake nozzle. The distributing means includes manual control means acting on a movable adjustment member between the delivery jets or on a movable one of the jets to provide proportional adjustment of the deliveries of the delivery jets of the back-pressure chambers, for simultaneous variation of the pressures in the chambers and adjustment of mixer delivery by means of the distribution valves.

1 Claim, 6 Drawing Figures

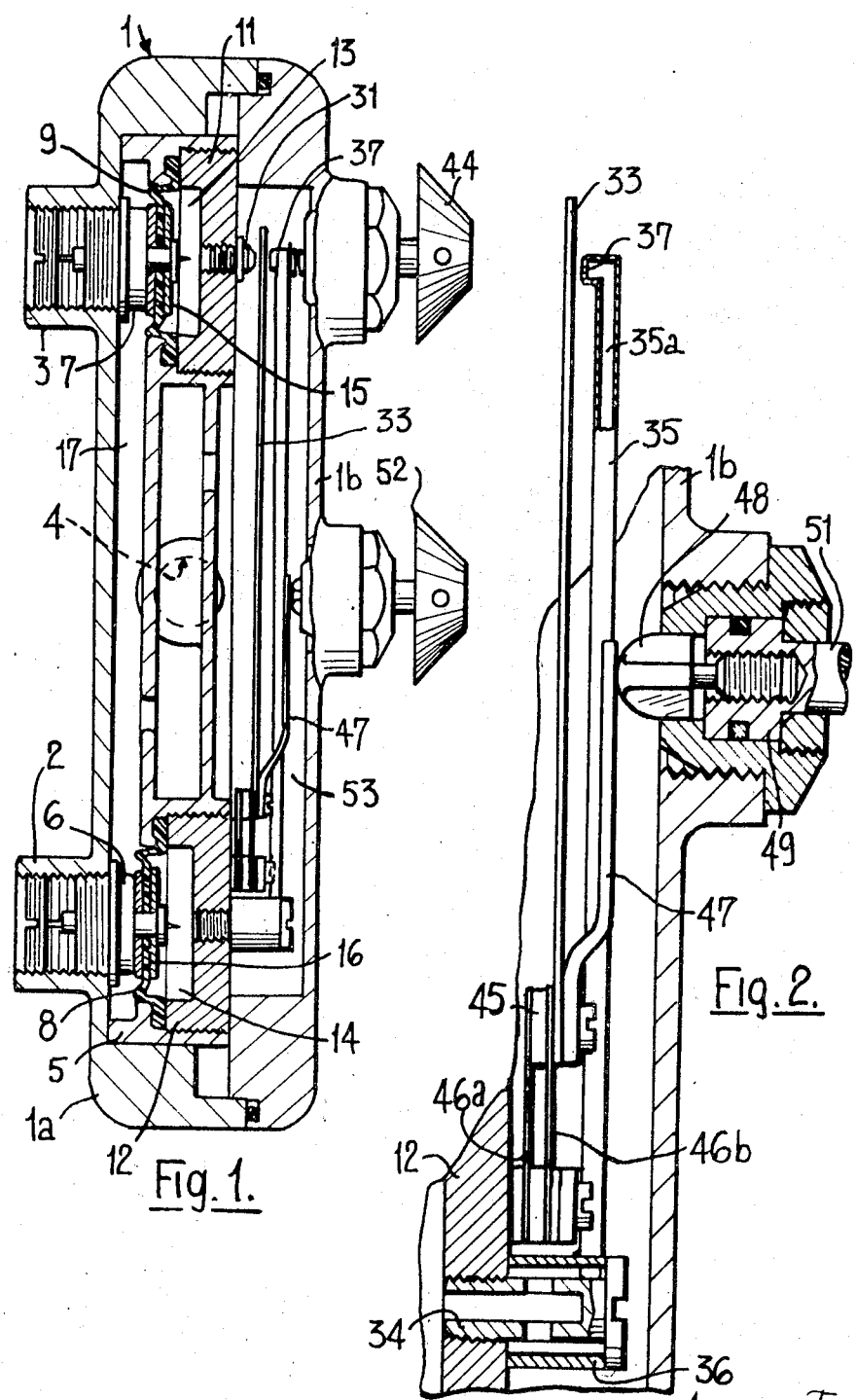

3,642,199

THERMOSTATIC MIXER FOR HOT AND COLD LIQUIDS

BACKGROUND

This invention relates to a thermostatic mixer for hot and cold liquids comprising a distributor which responds to the deformation of a thermostatic bimetallic strip in contact with the mixture and which controls the deliveries from two jets, such deliveries determining the pressures in back-pressure chambers closed by the actuating diaphragms of two diaphragm-type distribution valves one of which controls the cold liquid inlet and the other of which controls the hot liquid inlet, the chambers being supplied as a bypass from the upstream side of the valves.

The known mixers of this kind, which are used mainly in sanitary installations, have the following disadvantages:

The temperature of the mixture is affected by variations in the pressure and temperature of the hot water, and such variations are common in the sanitary installations used in buildings.

As a rule, several types have to be available, with different diaphragms and back-pressure springs, for use on low-pressure and high-pressure water distribution systems.

To control delivery (including shutting off the supply), valves must be provided upstream or downstream of the mixer; the valves are responsible for pressure losses impairing satisfactory operation of the mixer. Also, these valves, which are separate from the distribution valves, increase first costs.

SUMMARY

It is an object of the invention to provide a mixer free from these disadvantages.

Accordingly, the invention provides a thermostatic mixer for hot and cold liquids including:
- a casing in which mixing of the liquids takes place and which has a first inlet for hot liquid and a second inlet for cold liquid;
- first and second diaphragm-type distribution valves disposed in the casing and arranged respectively to control liquid flow through the first and second inlets;
- first and second back-pressure chambers respectively adjacent the first and second distribution valves and each closed by the diaphragm of the respective distribution valve, each chamber having an intake through which liquid is supplied as a bypass from the upstream side of the respective distribution valve and a delivery jet through which liquid is delivered;
- distributing means arranged to control the delivery of liquid from the delivery jets of the back-pressure chambers thereby to determine the pressures in the chambers; and
- a thermostatic bimetallic strip disposed to contact the mixture of liquids, the distributing means being responsive to the deformations of such strip; characterized in that:
- the intake of each back-pressure chamber includes an intake orifice having a variable cross section increasing with the extent of opening of the respective distribution valve; and
- the distributing means includes manual control means providing proportional adjustment of the respective deliveries of the delivery jets of the back-pressure chambers, for simultaneous variation of the pressures in the chambers and adjustment of mixer delivery by means of the distribution valves.

BRIEF DESCRIPTION OF THE DRAWINGS

Further objects and advantages of the invention will become apparent from the following description of preferred embodiments, given by way of example, with reference to the appended drawings, in which:

FIG. 1 is an overall view of one embodiment of mixer in longitudinal section;

FIGS. 2 and 3 are partial views of the mixer of FIG. 1 on an enlarged scale;

DESCRIPTION OF PREFERRED EMBODIMENTS

Figure 3:
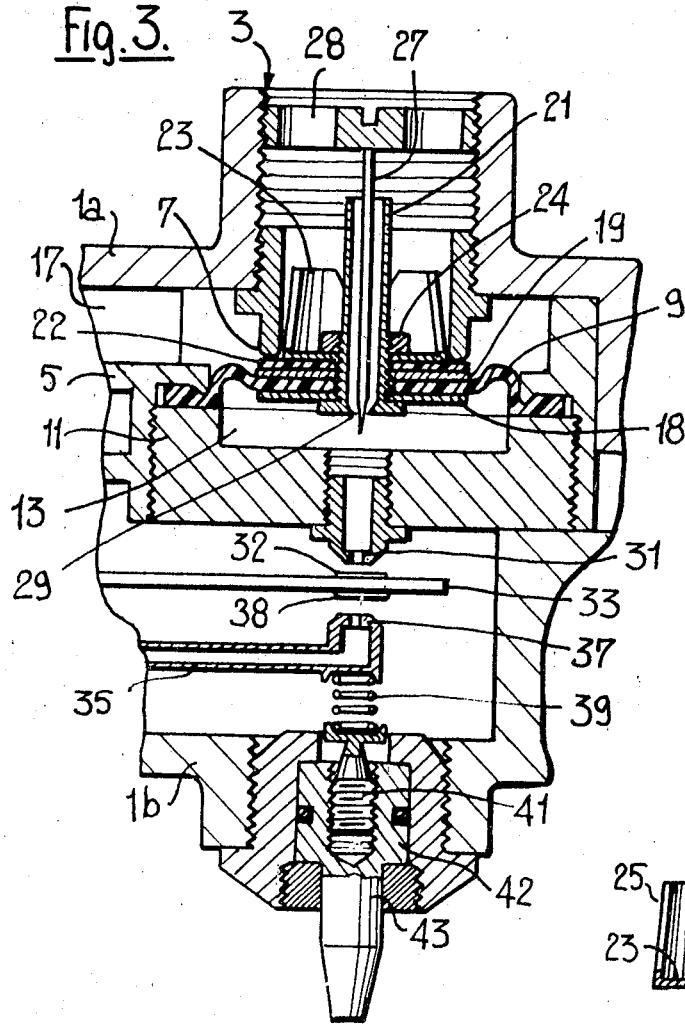

The mixer shown comprises a casing 1 constituted by a base 1a and a cover 1b assembled together by screws (not shown). Base 1a has two inlet spigots 2, 3; hot water is taken in through spigot 2 and cold water through spigot 3. Base 1a also has a spigot 4 through which the mixture of hot and cold water is delivered.

Disposed in casing 1 is a releasable member 5 comprising two flexible diaphragms 8, 9 which are disposed opposite annular seats 6, 7 screwed into the inlet spigots 2, 3. The diaphragms have their peripheries clamped by plugs 11, 12 which are screwed into member 5 and which bound two back-pressure chambers 13, 14 behind the diaphragms 8, 9.

Disposed at the center of each diaphragm 8, 9 is a distribution valve 15, 16 controlling the intake of hot and cold water into a mixing chamber 17. The valves 15, 16 are of identical construction, as will be described hereinafter with reference to FIG. 3.

Referring now to FIG. 3, the central part of diaphragm 9 is clamped between two metal washers 18, 19 threaded on a central tubular rod 21. A sealing washer 22 is clamped between washer 19 and a cock casing 23. A nut 24 screwed on rod 21 clamps the integers 22, 19, 23 together so that the same move solidly with the central part of diaphragm 9.

Figure 4A:
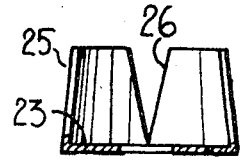
FIGS. 4a and 4b are views, in axial section and plan respectively, of a member of a distribution valve of the FIG. 1 mixer.
Figure 4B:
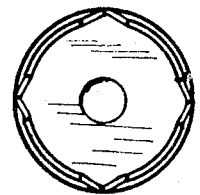

When the valve is in the closed position, the periphery of washer 22 bears on the corresponding opposed seat 7. Casing 23 has a skirt 25 formed with four recesses 26 which are either V-shaped, as shown in FIGS. 4a and 4b, or ogival.

Extending through rod 21 is a needle 27 borne by a screwthreaded disc 28 pierced with four apertures through which water can flow. Needle 27 terminates in a conical part which engages in a calibrated nozzle 29 at the end of rod 21.

Back-pressure chamber 13 is, therefore, supplied with water from spigot 3 via the passage in rod 21 and via nozzle 29. Chamber 13 can discharge through a delivery jet 31 formed with a delivery orifice disposed opposite a movable closure member 32 at the free of a thermostatic bimetallic strip 33.

The valve 15 operates as follows:

When jet 31 is closed by closure member 32, the pressure in chamber 13 is the same as the pressure at the inlet, and diaphragm 9 takes up a position such that washer 22 is firmly engaged with seat 7. The valve is therefore in the closed state. On the other hand, if water can flow through the jet 31, the pressure drop in chamber 13 causes diaphragm 9 to move so that the valve opens. During this movement the nozzle 29 moves along the conical portion of needle 27, so that the intake of water into chamber 13 increases in proportion as the valve opens. Consequently, the diaphragm finds a new equilibrium state after a movement which depends on the delivery which the jet 31 can provide.

As can be seen in FIGS. 1 and 2, the back-pressure chamber 14 behind diaphragm 8 of hot water valve 16 communicates via a hollow screw 34 with a duct 35a inside a tube 35 rigidly secured to a sleeve 36 clamped below screw 34. At its free end tube 35 has a jet 37 formed with a delivery orifice disposed opposite a closure member 38 (FIG. 3) borne by bimetallic strip 33.

The free end of tube 35 tends to come near cover 1b because of the shape of tube 35 and is borne by an adjustable abutment comprising a spring 39 disposed between tube 35 and the end of a screw 41 which is screwed into a tapped socket 42 and which is extended by a rod 43 carrying a knob 44. The knob can be rotated in either direction to advance or withdraw the screw 41 and thus vary the space between the two jets 31 and 37. The flow through the jet 37 determines the pressure in chamber 14 and therefore determines the extent of opening of the valve 16 controlling the flow of hot water to mixing chamber 17.

The two jets 31, 37 and the bimetallic strip 33 which is in contact with the mixture therefore form a distributor controlling the pressures in the back-pressure chambers of the distribution valves.

As can be seen in FIG. 2, strip 33 is secured to a block 45 which is borne by two resilient strips 46a, 46b and which supports an arm 47 in bearing engagement with an adjustable abutment taking the form of a screw 48 screwed into a socket 49 and extended by a rod 41 bearing a knob 52, which can be rotated in either direction to vary the spacing between strip 33 and the stationary nozzle 31.

The mixer operates as follows:

For the closed position, knob 44 is turned so that strip 33 is clamped between the two oppositely disposed jets 31, 37, which are therefore in the closed state. The two distribution valves 15, 16 are closed by the pressure in the back-pressure chambers 13, 14.

To enable the mixture to flow, the operator turns knob 44 so as to move the movable jet 37 away from the stationary jet 31. Strip 33 is adapted to bear on jet 31 when cold and to move away therefrom progressively in proportion as the temperature of the mixture in the exit chamber 53, where the strip 33 is disposed, rises.

The initial opening of the single jet 37 causes the hot-water valve 16 to open, so that hot water is supplied to exit chamber 53. The result of the temperature rise in chamber 53 is that the strip 33 is deformed and gradually moves away from jet 31 and towards jet 37. This adjustment gradually slows down the hot-water supply and gradually opens the cold-water supply by adjusting the pressures in the chambers 13, 14 of the two distribution valves in opposite senses, the total delivery remaining substantially constant for a given position of knob 44 and of moving jet 37. This oppositely directed trend in hot and cold water delivery continues until the mixture is at the required temperature, mixture delivery being determined by the separation between the jet 31 and the jet 37.

Mixture temperature can be adjusted by rotation of the knob 52, to vary the position of the bimetallic strip 33 borne by the resilient strip 46. The result of this step is that the proportion between the hot water and the cold water alters but there is substantially no change in the total delivery set by knob 44.

To vary mixer delivery or to stop delivery completely, the knob 44 can be operated either to move the jets 31 and 37 farther apart, to increase delivery, or to bring them closer together, to decrease delivery. In the latter case, therefore, the movement of the jet 37 towards the bimetallic strip decreases hot-water delivery, with the result that the mixture temperature decreases and the bimetallic strip 33 moves towards the jet 31 and thus reduces the cold-water delivery, so that the two valves take up a fresh equilibrium position corresponding to reduced deliveries. This correction occurs quickly enough for the mixture temperature not to vary appreciably. As the knob 44 is rotated further to advance the jet 37, the strip 33 becomes clamped between the two jets, so that all delivery ceases completely because of the two distribution valves closing.

Since the distributor, in the form of the oppositely disposed jets 31 and 37, is closable, no further valve is required for the inlet and delivery piping; mixer delivery can be controlled by means of knob 44.

Also, since the cross section of the intake jets of the back-pressure chambers 13, 14 is variable, mixer operation is substantially independent of pressure variations in the mixer feed, for equilibrium of the supply valves is produced without the need for any opposing spring and the same mixer can readily be fitted to both low-pressure and high-pressure supply systems. The shape of the conical portion of the needles depends upon valve characteristics and can be inter alia parabolic or conical.

Figure 5:
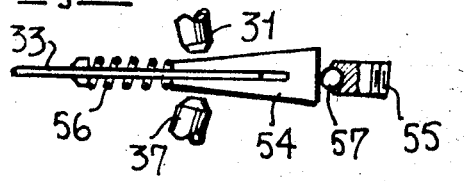
FIG. 5 is a diagrammatic partial view of a variant embodiment of mixer.

In the variant shown in FIG. 5, the two distributor jets 31, 37 are stationary and the bimetallic strip 33 bears a closure member 54 of variable width, member 54 being movable on strip 33 through the agency of an operating screw 55 to close the distributor or vary delivery. A spring 56 maintains member 54 in bearing engagement with this screw but permits movement of member 54 by strip 33, friction being reduced by a ball 57.

I claim:

1. A thermostatic mixer for hot and cold liquids including
a casing in which mixing of the liquids takes place and which has a first inlet for hot liquid and a second inlet for cold liquid,
first and second diaphragm-type distribution valves disposed in the casing and arranged respectively to control liquid flow through the first and second inlets,
first and second back-pressure chambers respectively adjacent the first and second distribution valves and each closed by the diaphragm of the respective distribution valve, each chamber having an intake through which liquid is supplied as a bypass from the upstream side of the respective valve and a delivery jet through which liquid is delivered,
distributing means arranged to control the delivery of liquid from the delivery jets of the back-pressure chambers thereby to determine the pressures in the chambers,
a thermostatic bimetallic strip disposed to contact the mixture of liquids, the distributing being responsive to the deformations of such strip,
the intake of each back-pressure chamber includes an intake orifice having a variable cross section increasing with the extent of opening of the respective distribution valve,
the distributing means includes manual control means providing proportional adjustment of the respective deliveries of the delivery jets of the back-pressure chambers, for simultaneous variation of the pressures in the chambers and adjustment of mixer delivery by means of the distribution valves,
the delivery jets of the back-pressure chambers take the form of two nozzles formed opposite one another with delivery orifices, at least one of the nozzles being movable by the manual control means to vary the spacing between the delivering orifices,
the distributing means includes a movable adjustment member disposed between the delivery orifices and responsive to deformations of the bimetallic strip, and
one of the nozzles constituting the delivery jets is disposed at the free end of a tube which has its other end fixedly supported and through which liquid is supplied to the nozzle from the respective back-pressure chamber, such tube being borne at its free end by adjustable abutment means enabling the position of the nozzle to be adjusted as a result of displacement of the free end of the tube.

* * * * *